United States Patent [19]
Kunii et al.

[11] Patent Number: 5,623,428
[45] Date of Patent: Apr. 22, 1997

[54] METHOD FOR DEVELOPING COMPUTER ANIMATION

[75] Inventors: Tosiyasu Kunii; Lining Sun, both of Tokyo, Japan

[73] Assignee: Shukyohoji, Kongo Zen Sohozan Shoriji, Kanagawa-ken, Japan

[21] Appl. No.: 178,217

[22] Filed: Jan. 6, 1994

Related U.S. Application Data

[63] Continuation-in-part of Ser. No. 714,307, Jun. 12, 1991, abandoned.

[30] Foreign Application Priority Data

Dec. 25, 1990 [JP] Japan ................... 2-418252

[51] Int. Cl.⁶ .................................. G06F 17/00
[52] U.S. Cl. ............. 364/578; 395/95; 395/86; 395/173
[58] Field of Search .................. 364/578, 174, 364/191; 395/95, 86, 152; 434/258

[56] References Cited

U.S. PATENT DOCUMENTS

| | | | |
|---|---|---|---|
| 3,510,210 | 5/1970 | Von Haney | 395/152 |
| 4,603,284 | 7/1986 | Perzley | 395/95 |
| 4,621,332 | 11/1986 | Sugimoto et al. | 364/174 |
| 4,631,676 | 12/1986 | Pugh | 364/413 |
| 4,641,251 | 2/1987 | Inoue | 364/191 |
| 4,752,836 | 6/1988 | Blanton et al. | 395/152 |
| 4,819,184 | 4/1989 | Joensson et al. | 364/513 |
| 4,826,392 | 5/1989 | Hayati | 414/730 |
| 4,834,057 | 5/1989 | McLeod, Jr. | 128/782 |
| 4,851,748 | 7/1989 | Daggett et al. | 395/95 |
| 4,868,474 | 9/1989 | Lancraft et al. | 395/86 |
| 4,891,748 | 1/1990 | Mann | 364/410 |
| 4,925,312 | 5/1990 | Onaga et al. | 395/95 |
| 4,974,210 | 11/1990 | Lee | 395/95 |
| 5,025,394 | 6/1991 | Parke | 395/152 |
| 5,090,042 | 2/1992 | Bejjami et al. | 378/99 |
| 5,099,859 | 3/1992 | Bell | 128/781 |
| 5,120,228 | 6/1992 | Stahl et al. | 434/258 |
| 5,151,859 | 9/1992 | Yoshino et al. | 364/424.01 |
| 5,159,988 | 11/1992 | Gomi et al. | 901/1 |
| 5,184,295 | 2/1993 | Mann | 364/410 |
| 5,187,796 | 2/1993 | Wang et al. | 395/800 |
| 5,255,753 | 10/1993 | Nishikawa et al. | 901/1 |

FOREIGN PATENT DOCUMENTS 0920687 2/1973 Canada ................... 395/152

OTHER PUBLICATIONS

E. Popov, "Modern Robot Engineering", *ST Technology Series*, 1982.

Cramblitt, B. "Computers Capture Moments of Motion", *Computer Graphics World*, 12(3):50–57, 1989.

Phillips, C.B. et al "Interactive Real–time Articulated Figure Manipulation Using Multiple Kinematic Constraints", 1990 Symposium on Interactive 3D Graphics, *Computer Graphics*, 24(2):242–250, 1990.

*Primary Examiner*—Vincent N. Trans
*Attorney, Agent, or Firm*—Browdy and Neimark

[57] ABSTRACT

A method for developing computer animation using dynamics analysis comprises analyzing the basic motions of a moving body such as a human or animal body and inputting the force or torque exerted on each joint into a database, dividing each body segment from other body segments and calculating the movements of the segments by applying dynamic equations, checking constraints including the articulation of the moving body and the range of movements of the joint, calculating motions and forces produced by the restraints by applying the inverse dynamics, calculating the movements of individual segments by applying dynamic equations to develop new motions, checking restraints including the articulation of the moving body and the range of movements of each joint, calculating the motions and forces due to the restraints by inverse dynamics, and displaying the motions and forces.

2 Claims, 4 Drawing Sheets

METHOD FOR DEVELOPING COMPUTER ANIMATION

CROSS-REFERENCE TO RELATED APPLICATIONS

The present application is a continuation-in-part of U.S. application Ser. No. 07/714,307, filed Jun. 12, 1991, now abandoned, the entire contents of which are hereby incorporated by reference. The present invention is also related to applications Ser. Nos. 07/712,884, 07/714,304 and 07/714,306, all filed Jun. 12, 1991, 08/139,703, filed Oct. 5, 1993, all now abandoned in favor of CIP application Ser. No. 08/182,545 filed Jan. 18, 1994 and 08/172,704, filed Dec. 27, 1993, all to the same inventors as the present application.

BACKGROUND OF THE INVENTION

The present invention relates to a method for developing computer animation. More particularly, the present invention relates to realistic and aesthetically pleasing computer animation achieved by taking into consideration the physical properties of the moving objects represented by the animation and the physical principles that govern the movement of the objects.

In order to produce high quality computer animation, it is necessary to analyze the motions of the object being represented, such as a human or animal body, and form an animation program on the basis of the analysis. In order to produce animation which performs the motions of a human being, for example, it is necessary to analyze the motions of a human being and then design motions to be displayed by the computer. The motions of an object are observed by the animator and then, on the basis of his observations, a curriculum or a program for producing the same motions by the computer model is formed. However, because observations are subjective, often based on the intuition of the animator, they may not give accurate results.

There has recently been proposed a technique wherein the motions of a human being or an animal are analyzed using a computer. See D. I. Miller, "Computer Simulation of Human Motion", in D. W. Grieve et al, (eds), *Techniques for the Analysis of Human Motion*, Lepus Books, London, 1975; Calvert T. W. et al, "Composition of Multiple Figure Sequences for Dance and Animation", *Proceedings CG International '89*, pp. 245–254 (1989); and Nigel W. J. et al, "Some Methods to Choreograph and Implement Motion in Computer Animation", *Proceedings of Computer Animation '89*, 125–140 (1989). In analyzing motion using a computer, an animator analyzes the motions depending on his understanding by applying kinematics, which describes the motions only in terms of positions, velocities and accelerations, neglecting the forces and torques responsible. Thus, kinematics analysis can only generate a line picture representing parts constituting a human or animal body, and a three-dimensional model of the human or animal body cannot be displayed realistically on a screen. Accordingly, the motions designed may be unreasonable and also it is difficult to develop a new motion.

Another method uses dynamics. While kinematics provides motion analysis in terms of positions, velocities and accelerations, dynamics provides the motions of objects based on the relation between movements and forces. If dynamics is applied to create computer animation, it is possible to generate complex behavior with the animator's minimal control. Furthermore, an animation method utilizing dynamics has the great advantage of avoiding the limitations of methods utilizing kinematics.

However, an animation method utilizing dynamics requires data on dynamic parameters such as the moments of inertia, the centers of gravity, joint friction and muscle/ligament elasticity of the moving body being represented by the animation, which parameters are difficult to measure. Without such data, animation based on dynamics provides unrealistic motions similar to the case of animation using kinematics. Furthermore, it is necessary to solve rather complex dynamics equations. For a human body, an articulated body with 200 degrees of freedom, it is necessary to solve 600 simultaneous differential equations.

Thus, animation methods which have been proposed thus far are not well suited for representing complex motions. Therefore, there is no animation method capable of representing all the motions of a human or animal.

There has been some research on the use of artificial intelligence and expert systems to capture the knowledge and skills of the animator. Other animation methods that have been suggested include a constraint-based approach and a frame-based approach.

In conventional animation methods, basic data on the motions of humans or animals, such as the dimensions of body parts, moments of inertia, and constraints that define the range of movement of individual joints is determined by the animator relying on his intuition.

Conventional animation methods utilizing dynamics to represent the movements of a human body, for example, involve the following steps.

(1) Constructing a model of the human body;

(2) Applying the actual motions of a human to the model;

(3) Analyzing the motions of the model;

(4) Creating a new motion; and (5) Displaying the new motion on a screen.

In the fourth step (creating a new motion), a method which can exactly solve the dynamic equations using the Gibbs formula is particularly suitable. However for an actual animation system, this method has not been used because of its complexity, since when n is the number of segments constituting the model and forming minimal units of motion, the computational complexity of $O(f(n))$ becomes a function of $O(n^4)$ of $n^4$, and thus is very large. Thus, dynamical simulation methods such as that disclosed in Wilhelms J. P. et al. "Using Dynamic Analysis to Animate Articulated Bodies such as Humans and Robots", *Proceedings, Graphics Interface '85*, 97–104 (1985) have not been accepted mostly because of its conceptual complexity and computational expensiveness, A motion analyzing method which reduces the computation complexity to $O(n)$, a function of n, enabled by neglecting rotations about the principal axes, has been proposed. Armstrong W. W. et al, "The Dynamics of Articulated Rigid Bodies for Purposes of Animation", *The Visual Computer*, 1:231–240 (1985). However, when the rotations of joints about the principal axes cannot be neglected, this method is not applicable. Thus, by using this method, the forces that produce a motion or the forces that are produced by a motion cannot be displayed exactly and a realistic three-dimensional model of an articulated body cannot be obtained.

In a publication from the department of the present inventors, Sun, L. et al. "An Architectural Design of a Sports Instruction System", *First International Conference and Exhibition on Visual Computing for Defense and Government* (VISUDA '89), Paris, France (1989) (Technical Report 89-017), a system for inputting and analyzing human body movement is disclosed. The human body is modeled as a set of articulated segments each of which is essentially a rigid solid. In this model, the human body is represented by 50 segments. The system takes in a set of measurements taken with an actual human body and converts it into the size data for each segments e.g., length, width and diameter. When displaying the model the system approximates each segment with a polygon and performs a smooth shading for better appearance. In addition, the system calculates the center of gravity and the mass for each segment which will be required in the analysis. A video recorder preferably several video recorders, recording the movement from a plurality of points of view, records the motion of actual humans in a time sequence of video frames. The position of objects in each frame is input to the system to reproduce and analyze the movement. In order to define the position and configuration of the body in space, the position and orientation of each segment are specified. Therefore, for each segment there are six degrees of freedom, three for the position and three for the orientation. Each segment in an articulated body, however, is restricted by attachments to neighboring segments. Therefore, it suffices to specify the position of only one segment (orientation must be specified for all segments), thereby reducing the degrees of freedom considerably. The user specifies the position of each body segment by manipulating this figure using a mouse; the user picks a segment and translates and or rotates it so that the displayed figure assumes the position of the figure on the videotape. The image of a video frame can be superimposed on each window to facilitate this process.

The body movement which has been input into the computer is then analyzed considering two factors: the movement of the center of gravity and the force exerted on each segment of the body. The position vector G of the center of gravity of a human body is computed by the following formulation:

$$G = \frac{\Sigma g_i \Delta m_i}{\Sigma \Delta m_i}$$

where $g_i$ is the position vector of the center of gravity of a segment i and $\Delta m_i$. Since each segment is assumed to be a uniform rigid body, $g_i$ and $\Delta m_i$ can be obtained prior to this calculation from the measurement data.

The center of gravity of each segment is computed in a way similar to the above formulation. Each segment is divided into small wedge-shaped volumes around and along the central axis through the segment, and these volumes are summed up to find the position of the center of gravity.

The problem of computing the force exerted on a human body from its movement is a problem of inverse dynamics. One starts with the sequence of positions and obtains the velocity and the acceleration of each part of the body, from which the force that has caused such motion is to be calculated.

Solving a problem of dynamics is essentially solving differential equations which describe the relationship between mass and force and torque applied to it. A variety of formulations are available for describing the dynamics equation. They all produce the same result expressed in slightly different terms. One of the most familiar formulations is Lagrange's equation:

$$\frac{\partial L}{\partial q_i} - \frac{d}{dt} \frac{\partial L}{\partial \dot{q}_i} + \lambda \frac{\partial f}{\partial q_i} + Q_i = 0$$

where L is the Lagrangian given by kinetic energy (T) minus potential energy (P), $q_i$ is the ith coordinate, f is a constraint equation, $\lambda$ is an undetermined multiplier, and $Q_i$ is the force or torque applied to the ith coordinate.

In a general animation system, the dynamics approach is not yet practical due to the high computational complexity and cost required. The articulated body of the Sun publication model, consisting of 50 segments, requires 300 (=50×6) simultaneous equations to describe it. However, the use of known forces, such as the reactive force between a foot and a floor, simplifies the situation. For each segment, we have $$\begin{aligned} L &= \frac{1}{2} m V_g(X_a, X_b, \dot{X}_a, \dot{X}_b)^2 + \\ &\quad \frac{1}{2} I \omega_g(X_a, X_b, \dot{X}_a, \dot{X}_b)^2 - P(X_a, X_b) \\ &= L(X_a, X_b, \dot{X}_a, \dot{X}_b) \\ f &= |X_a - X_b| - 1 \\ &= f(X_a, X_b) \end{aligned}$$

where m is the mass of the segment, $V_g$ is the velocity vector of the center of gravity, $X_a$ and $X_b$ are the position vectors of its two ends, a and b, $\dot{X}_a$ and $\dot{X}_b$ are the velocity vectors, I is the inertia tensor, $\omega_g$ is the angular velocity vector around the center of gravity, and 1 is the distance between two ends.

Sun proposes letting the left side of the above Lagrange's equation be D. Then $$D(X_a, X_b, \dot{X}_a, \dot{X}_b, \lambda, F_a, F_b) = 0$$

where $F_a$ and $F_b$ are the forces exerted on a and b, respectively. Each segment has six degrees of freedom, and there are six degrees of freedom, and there are six Lagrange's equations describing it. In the above Lagrange's equations $D(X_a, X_b, \dot{X}_a, \dot{X}_b, \lambda, F_a, F_b)$, the three components of $F_a$ (x,y,z) and $F_b$ (x,y,z), and $\lambda$ are unknown. Therefore, there are seven unknown variables in total in the the system of six equations. If the force in one direction can be obtained through some means (e.g. by measurement), $\lambda$ and five other force components can be computed by solving these equations Sun then supposes that a segment i is connected at an end $b_1$ to an end $a_j$ of another segment j. By Newton's Third Law of Motion, the force exerted on the segment i at $b_i$ is equal and opposite to the force exerted on the segment j at $a_j$. By solving the equations for the segment i, one also obtains a partial solution (three of the seven unknown variables) for the segment j as well. By repeating this process, solutions can be found for all segments making up the body.

As the starting point of a series of calculations, Sun suggests using the force exerted on a foot by the floor, which was measured in advance to calculate the force exerted on the joint of the foot and shin. Then one works upward to head and lower arms through shins, thighs, hip, waist and torso. In the end, one has calculated the force exerted on each segment at its ends. Note that the force calculated here is the sum of internal force and external force. Internal force is exerted by muscles on attached joints. For the segments on which no external force is exerted, the result is equal to just the internal force. On the other hand for the segments with no internal force, the result is equal to the external force.

While this system of inputting and analyzing human body movement is useful for computerizing the dynamics of videotaped human movement, it does not solve the problem of how to produce practical animation works in a manner which simulates the motion of a human body as closely as possible, with a real time response, without relying on trial and error or an unworkable magnitude of calculations.

SUMMARY OF THE INVENTION

It is an object of this invention to provide an animation developing method utilizing dynamics analysis which enables an animator to design motions in an interactive manner based on the actual motions of a human or animal body without requiring trial and error or the intuition of the animator.

It is another object of the present invention to provide an animation developing method which can generate a realistic three-dimensional modeling picture.

It is yet another object of the present invention to provide an animation developing method which can represent all the motions of a human or animal body.

In an animation developing method according to the present invention, basic motions of a human being or animal body are analyzed to generate data on dynamic parameters including the forces and torques exerted on joints of the body, and this data is stored in a database. A programmer (animator) then accesses the database and modifies the data, and a computer provides the animator with feedback in real time on the result of constraints in terms of constrained motions and the result of inverse dynamics in terms of forces. The animator can design new motions in an interactive manner by repeating the above processes until satisfactory results are obtained.

The computational complexity of the method of the present invention is a function O(n), wherein n is the number of segments, so the computational complexity, and thus the time required for such computation is much less than with conventional animation methods. Furthermore, the present invention can illustrate the motions of human or animal bodies by smooth three-dimensional modeling pictures without requiring trial and error or the intuition of the animator.

DETAILED DESCRIPTION OF THE PREFERRED EMBODIMENTS

A preferred embodiment of the present invention will now be described with reference to the drawings.

Figure 1:
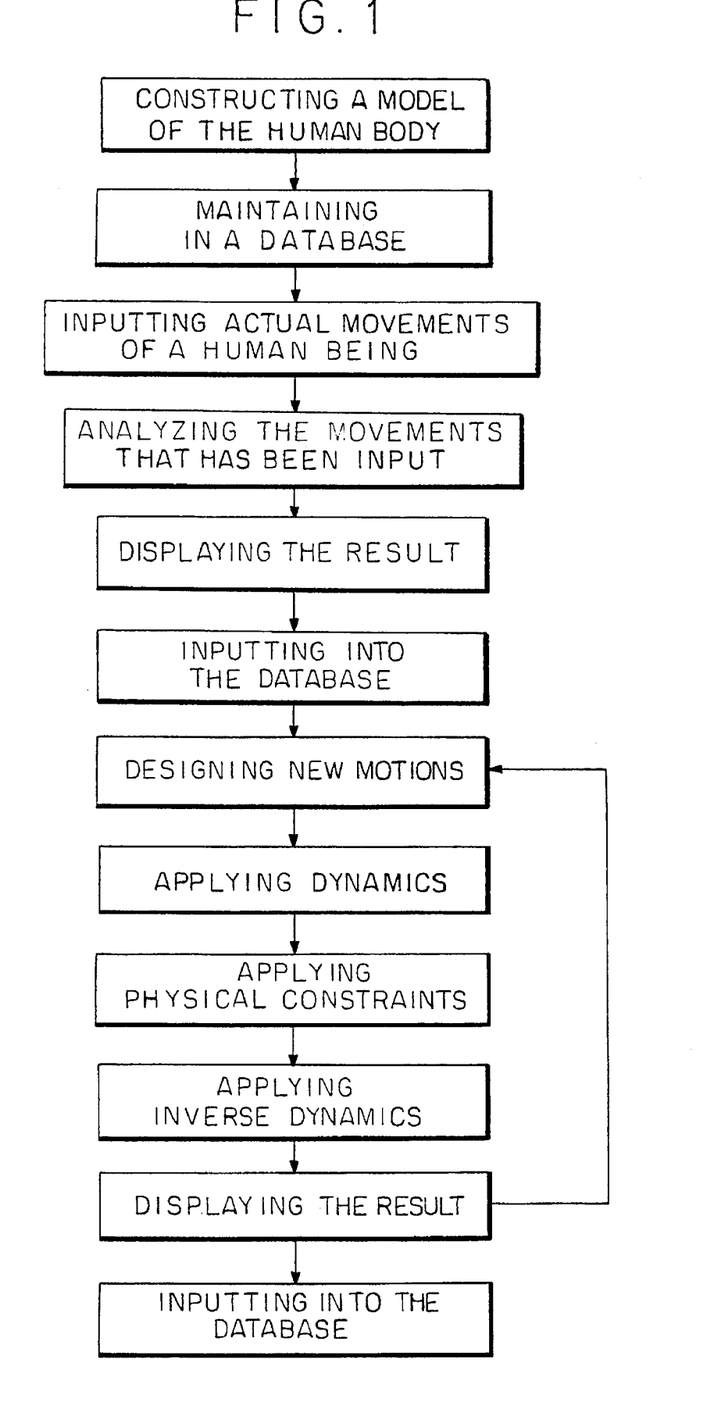
FIG. 1 is a flow chart of an animation developing embodiment according to this invention.

FIG. 1 shows a flow chart of one embodiment according to this inventions including following steps:

1. Constructing a model of a human body;
2. Maintaining a database;
3. Inputting actual movements of a human being;
4. Analyzing the movements that have been input;
5. Displaying the results;
6. Inputting the results into the database;
7. Designing new motions;
8. Applying dynamics;
9. Applying physical constraints;
10. Applying inverse dynamics;
11. Displaying the result;
12. Maintaining the result in a database.

Figure 2:
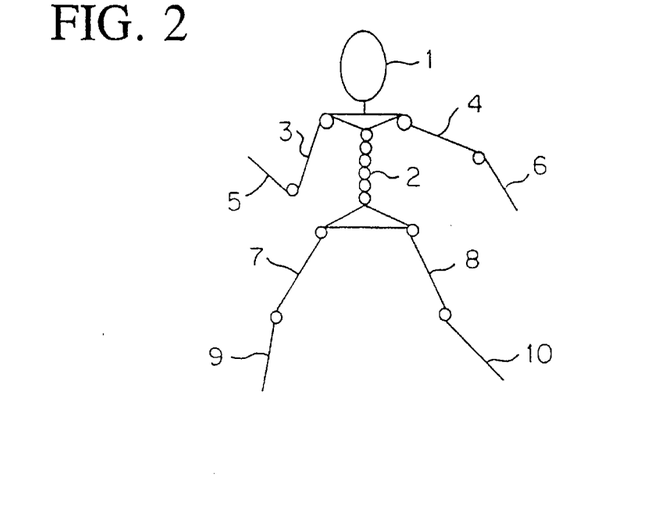
FIG. 2 is a schematic view showing structure of a model of a human body.

In the first step (constructing a model) the human body is divided into a plurality of segments connected by body joints, each of the segments acting as a minimal unit of motion, as shown in FIG. 2. A human body model then is constructed on the basis of the inherent nature of each of the segments and physical constraints such as the inter-relationship of each segment and the range of movements of the joints connecting the segments.

As shown in FIG. 2, the human body consists of parts, roughly divided, a head 1 a trunk 2 and four limbs, and each part is connected with the trunk 2 placed in the center of them. Upper limbs comprising of right and left arms consist of upperarms 3, 4, forearms 5, 6, and hands, respectively; each hand having five fingers, having a plurality of segments connected by joints (not shown). Lower limbs comprising of right and left legs also consist of 7, 8, 9 and 10 in like manner.

In this figure, the bones constructing the human body appear as lines, and the joints by which the bones are connected to each other appear as small circles. As shown in the figure, the bones described by lines are minimal units of motion which will not be divided further, and the joints described by small circles determine the mutual relationship of the bones.

The nature of these joints and bones constructing the human body; that is, interconnecting relationship on each of the segments and ranges of the movement of each joint are physical constraints. Data defining the model is stored in the computer on a database.

In the third step (inputting actual movements), a film is taken of the actual motions of a human body, and for each frame of the film or of the video film, the positions of the body parts of the human being are quantified and input to the computer for the modeling. This data is applied to the model and the computer calculates the position, velocity and acceleration of each segment of the model. When the human body is simultaneously filmed from a plurality of directions, the analysis in the next step can be executed more concretely. This is all as described in Sun et al (supra).

In the fourth step (analyzing the movements that have been input), the data as to motions input in the second step are analyzed using inverse dynamics using Lagrange's equation which describe the relationship of forces and movements. The center of gravity of each of the body segments, the force and torque exerted on each joint, the position of the center of gravity of the whole body and the forces and torques exerted on the centers of gravity are all calculated and then input into the database.

In the fifth step (displaying the result), the center of gravity of each of the body segments, the force and torque exerted on each joint, the position of the center of gravity of the whole body, and the forces and torques exerted on the centers of gravity resulting from the fourth step, are displayed by symbols such as arrows on a screen superimposed on a display of the human body model.

Figure 4A:
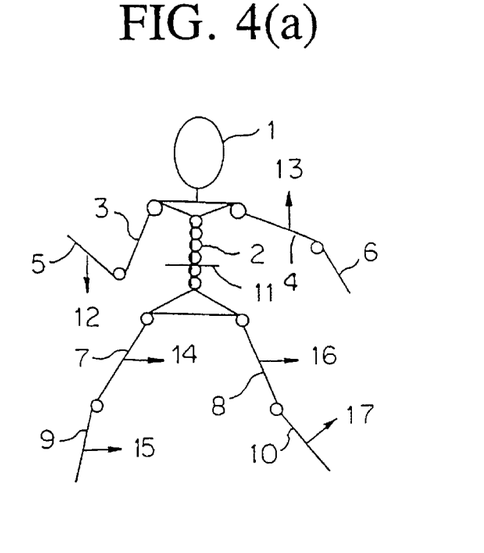
FIGS. 4(a) and 4(b) are views showing one example displaying on a screen a result of motion analysis according to this invention.
Figure 4B:
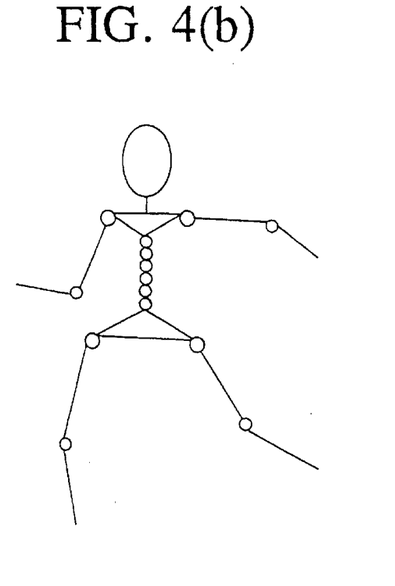

In FIG. 4(a), a cross symbol 11, showing the center of gravity of the whole body, and arrow symbols 12–17, showing the vector of the forces exerted on each center of gravity of each segment, are displayed superimposed on the human body model of the database when the human body model in FIG. 4(a) comes to that in the state of FIG. 4(b). This display describes forces exerted on the right forearm segment 5 as vector 12, on the left upperarm segment, 4 as vector 13 on the right thigh segment 7 as vector 14, on the right leg segment 9 as vector 15 on the left thigh segment as vector 16, and on the left leg segment 10 as vector 17.

Figure 5:
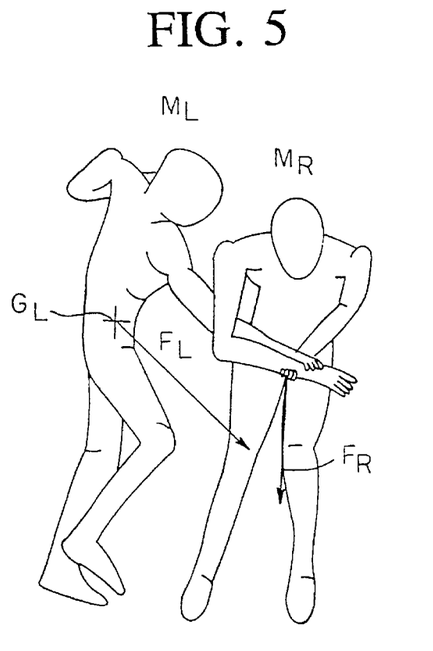
FIG. 5 is a view showing another example displayed a result of motion analyzing on a screen according to this invention.

FIG. 5 shows a display of an example of performing a skill by two persons in Shorinji Kempo, in which positions of the centers of gravity of the bodies and the forces exerted are superimposed on the model of the filmed human bodies. In this figure, the person MR on the right side seizes the right wrist of the person ML on the left side and acts the force shown as an arrow FR to the right arm of ML and, therefore, produces the force shown as another arrow FL onto the center of gravity GL of the whole body of ML. Accordingly, the display can show motions more concretely to be understood easily by anyone.

According to this invention, motions to be analyzed are calculated, on the basis of physical constraints and the inherent nature of each segment acting as the minimal unit of movements of a human or an animal body which are put into a database, and the motion and the center of gravity of each of the segments and the force and torque exerted on each joints the motion and the center of gravity of the whole body and the forces and torques exerted on the centers of gravity are obtained. The results obtained are, therefore, reasonable and realistic and the motions are easily understood by arrows showing directions of movements or forces appearing on the human body model on the screen.

In these steps the motion analysis of this invention is carried out.

Figure 3A:
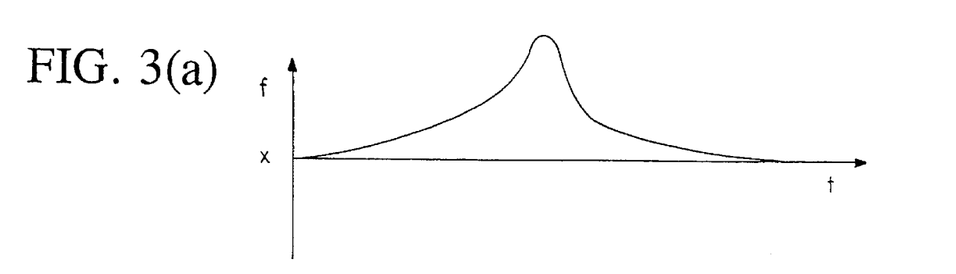
FIGS. 3(a), 3(b) and 3(c) control are graphs showing an example of the forces exerted on a segment joint of a human body.
Figures 3B, 3C:
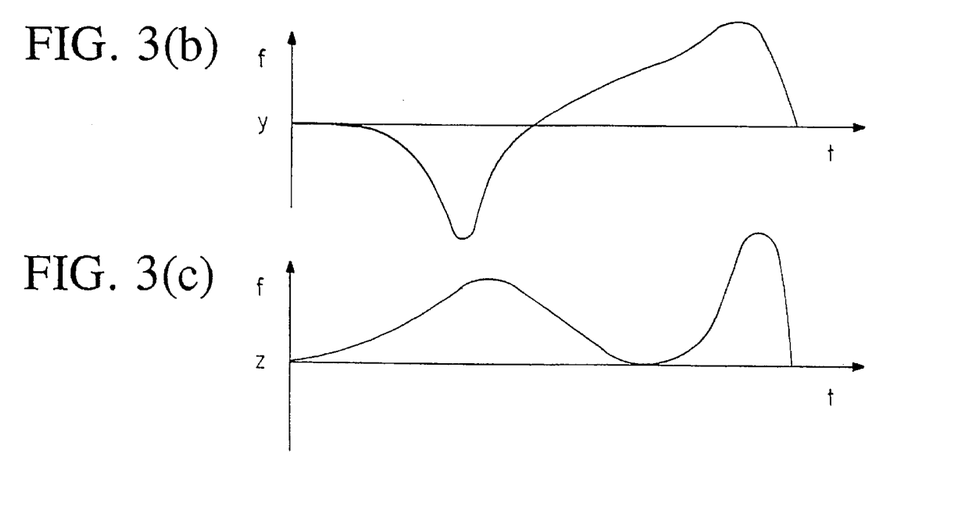

In the sixth step (inputting into the database), the resulting analysis is input into the database to be used further for developing new motions. One way of quantitatively representing the motions is by means of control graphs showing the forces acting on one of the joints of the model as a function of time. FIGS. 3(a)–3(c) is an example of control graphs of the forces acting on the left elbow of a golfer in the directions of x, y, and z orthogonal axes as a function of time. The data constituting the control graphs are determined from the motions of he model obtained after applying actual motions to the model and analyzing the results; and are stored in the database. Since the two forces exerted on any given joint are equal in magnitude and opposite in direction this constraint must be maintained by the system. A complicated motion is represented by a plurality of graphs. For example, the control graphs of a human being standing up from a chair and walking constitute a continuous composite motion. Each control graph for active segments is designed in the same manner as for the illustrated control graphs for the left elbow.

On the basis of the data input into the database, and particularly the control graphs showing all of the forces on each joint over time as the model goes through a particular motion or activity it is possible to design new motions (the sixth step of the flow chart). Thus, a new motion may be created starting with the information which is already available in the database.

Motions are designed at two levels: changing the speed of the motions and the forces causing the motions, and composing a complicated motion from the basic motions.

At first, the user chooses the basic motions from the database. Then, the dynamics parameters of the motions chosen are displayed using a two dimensional control graph, where the abscissa represents time and the ordinate represents the forces exerted on each joint of the body (FIG. 2). Since the two forces exerted on the same joint must be equal in magnitude and opposite in direction, this constraint must be maintained by the system. The user may be provided with various facilities to modify these physical parameters using a mouse To facilitate the modification two control modes are supported:

1. The global modification: The same changes of the forces are caused to all the human body parts on which the forces are exerted. This modification can involve scaling up or down of the x- or y-axis.

2. The local modification: It changes only the force exerted on a specific part of the body.

Another modification other than the motion is the modification of the acceleration due to gravity, which is necessary when simulating motion outside the earth.

The joint limits restrict the range of the joint movements, because the joints of a real human body cannot rotate arbitrarily in all directions. The limits are the constants of a given human body, which have been put into the database.

A complicated motion is represented by several control graphs, each of which is designed by the user by the same method. For example, the control graphs of somebody standing up from a chair and walking constitute a continuous composite motion. In case of Shorinji Kempo, a Japanese martial art, any kind of motion is based on 12 basic control graphs.

In the eighth step (application of dynamics), the motion of each body segment is calculated on the basis of the forces corresponding to the basic motions selected by the animator and dynamic equations governing movement of each segment. Although the segments of the body are actually connected with one another by joints, as shown in FIG. 2, in order to simplify the calculations, it is assumed for the moment that each body segment is independent of the other segments and the constraints on the articulation of the human body and its range of movement of joints are neglected for the moment.

Figure 6A:
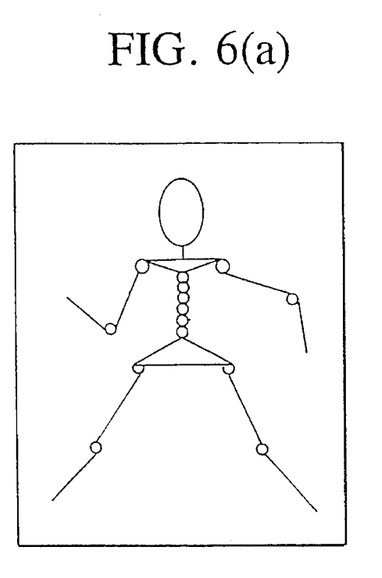
FIGS. 6(a) and 6(b) are views showing the results of the dynamics step in which body segments are identified and each segment is calculated independently, neglecting joint constraints, FIG. 6(a) being before the application of the dynamics step and FIG. 6(b) being thereafter.
Figure 6B:
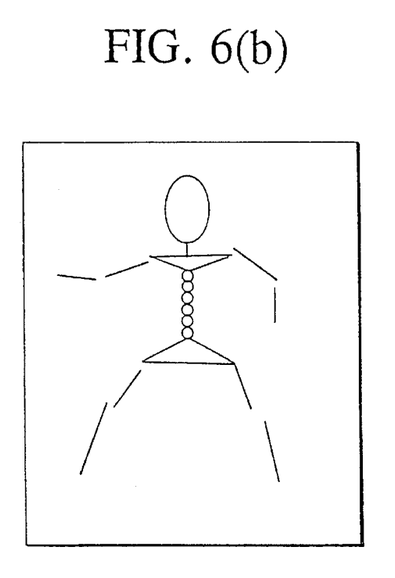

Dynamics calculates the path of each body segment independently of the rest, based on the forces specified by the user and the dynamics equations governing the segment movements. In this calculation, each body segment is firstly distinguished (FIG. 6(a) and 6(b)), and the articulation of the human body and the constraints regarding the range of the movements of joints are neglected for the present. The idea is to reduce the amount of computation. The results of calculation of the motions of every segment are passed to the next step where the physical constraints of the body are checked and enforced.

For each segment, the Newton-Euler formulation is used to calculate the motion. Newton's equation is used to derive the linear acceleration of the center of gravity as follows:

$$F_x = m\rho_x$$

$$F_y = m(\rho_y - g)$$

$$F_z = m\rho_z$$

where

F is the force exerted on the segment, m is the mass of the segment, p is the position of the center of gravity of the segment, and g is the acceleration of gravity.

Euler's equation is used to derive the angular acceleration about its center of gravity as follows:

$$N_x = I_x \dot{\omega}_x + (I_y - I_z)\omega_y \omega_z$$

$$N_y = I_y \dot{\omega}_y + (I_z - I_x)\omega_z \omega_x$$

$$N_z = I_z \dot{\omega}_z + (I_x - I_y)\omega_x \omega_y$$

where x, y, z are the directions of the principal axes,

N is the external torque being applied to the segment,

I is the principal moments of inertia, and

ω is the angular velocity of the segment.

Note that the principal moments of inertia are the diagonal elements when the inertia tensor is diagonalized, which are derived from the eigen values of the inertia tensor of the segment. And the corresponding principal axes are obtained from its eigen vector equations. Thus, before solving Euler's equation, the original coordinates must be transformed to the principal axes. The Euler angles can be used to perform the transformations.

Once new linear and angular accelerations are obtained, they must be integrated to find new velocities and integrated again to find new positions.

The Euler method is simplest to do this.

$$v_{t+\delta t} = v_t + a_t \delta t$$

$$P_{t+\delta t} = P_t + v_t \delta t + \tfrac{1}{2} a_t \delta t^2$$

where a is the acceleration, v is the velocity, p is the position, t is the time, and δt is the time period.

This method assumes acceleration is constant over the time period, and inaccurate results are obtained when the time period is large or accelerations are changing rapidly. More sophisticated methods may be found in a number of numerical integration methods (Press W H et al, "Numerical Recipes", Cambridge Univ. Press, Cambridge, England (1986)).

Figure 7A:
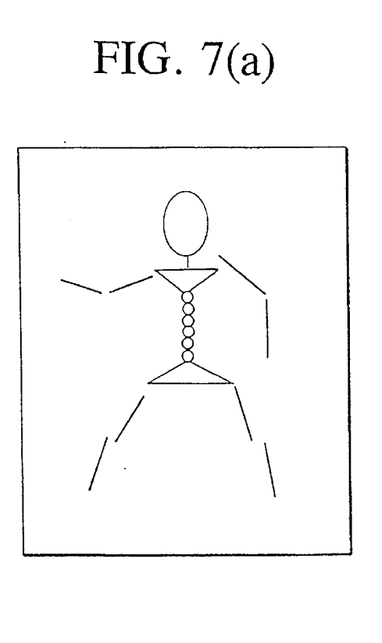
FIGS. 7(a) and 7(b) are views showing the results of the step of checking and enforcing constraints, FIG. 7(a) being before the application of constraints and FIG. 7(b) being thereafter.
Figure 7B:
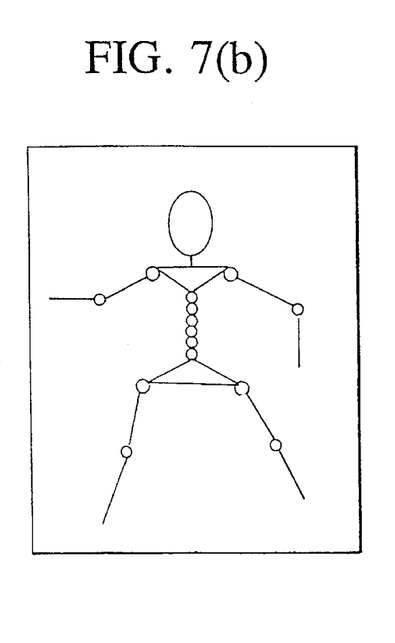

In the ninth step (application of constraints), the articulation of the human body and the range of the movements of the body joints are checked for each of the motions calculated in the eighth step (FIGS. 7(a) and 7(b)). The process of applying constraints starts at a segment referred to as a root element, and the position and the orientation of each segment in a subclass of the root element are checked sequentially. Here, two types of checks are performed. One is a check whether a subclass element is always connected to its superclass element. The other is a check whether the movement of each joint exceeds a specified range. If the subclass element is not connected to its superclass element, as shown in FIG. 7a, the subclass element is translated until it becomes connected to its superclass element. If the movement of any joint exceeds the specified range, the movement of the joint is adjusted to be within the range by rotation of the corresponding element, thus modifying the positions of the segments to obtain a posture as shown in FIG. 7b.

In the tenth step (application of inverse dynamics), Lagrange equations which describe the relationship between forces and movement are used to calculate the forces exerted on each joint of the body. Inverse dynamics uses Lagrange's equations which describe the relationship between forces and movements to calculate the forces exerted on each joint of the body (FIG. 5). 1.5 The Sun paper (supra) proposes a linear recursive algorithm to perform inverse dynamics with the computational complexity O(n) where n is the number of the body segments.

Note the fact that inverse dynamics can provide a reasonable and integrated set of forces for dynamics to produce the motions which are adjusted due to the constraints. Without inverse dynamics, it is impossible to expect the user to be able to find out an integrated force specification. In the method of the present invention, the orientation of each body segment is changed when the related joint limit is exceeded, and the position of each body segment is adjusted to the physical constraints of the body.

If the desired results are not first obtained, the seventh to eleventh steps can be repeated, and the new motions can be developed in an interactive manner.

In the eleventh step (displaying the result), as to the relation between movements and forces obtained from calculating utilizing dynamics, the center of gravity of each of the body segments, the force and torque exerted on each joint, the center of gravity of the whole body, and the force and torque exerted on the center of gravity of the whole body, can be displayed as symbols such as an arrow, superimposed over the human body model, as shown in FIG. 4, or over the human body displayed on a screen, in same manner as in the fifth step (displaying the result).

As a matter of course, the result of the calculated movements which have been analyzed using inverse dynamics can also be stored in the database to be used in the design of additional complicated motions.

It can thus be seen that the present invention provides a dynamic analysis based human motion animation using an articulated human body model. The method consists of two stages: analyzing the basic movements of an actual human being and using the analytic results to produce the new motions dynamically. The processes of dynamical simulation proceed in three steps: dynamics, constraints and inverse dynamics. The dynamics step distinguishes the articulated body into independent rigid segments (such as 50 rigid segments) and the motion of each segment is calculated independently of the motions of other segments by using the Newton-Euler equations. The idea is to reduce the number of degrees of freedom and thus the amount of computation required, and to avoid the complexity of dealing with continuum mechanics. In the constraint step, the articulation of the body and the range of movements of the body joints are checked and maintained. A segment which violates its constraints is moved by translations and rotations so that it becomes connected to its super-segment or is bent into a natural posture. In the inverse dynamics step, the forces that produced the new motions, which have been modified due to the constraints, are calculated. In the present invention, since the sequence is executed by a simple line feedback algorithm, the total computational complexity is O(n), where n is the number of the body segments. The user interacts with the system by specifying the control forces and getting the motions produced by the dynamics and the constraints, the forces being modified due to the constraints. The present method solves the computational problem that existed in dynamics and enables dynamics to produce real time feedback so that dynamics are now made well suited to computer animation work.

By using inverse dynamics, a reasonable and complete combination of forces can be obtained. In contrast, without inverse dynamics, it is impossible for the animator to find the complete design of forces. In the present invention, if the orientation of a body segment is such that the range of movement of either of its joints is exceeded, the orientation of the segment is changed so that the position of the body segment satisfies the physical constraints of the human body. Since the motions of the human body thus obtained are natural motions, in which a subclass segment is always connected to its superclass segment and the movement of each joint does not exceed the specified range, such motions can be displayed realistically using a three-dimensional modeling picture.

Furthermore, according to the present invention, it is possible to develop a new motion in an interactive manner using a computer without requiring trial and error or the intuition of the animator.

Animation of an animal body can be developed by the method of the present invention in the same manner as described above with respect to a human body. Similarly, any articulated system can be analyzed and animated in a similar manner.

As mentioned above, the animation developing method according to the present invention comprises the steps of analyzing the basic motions of an actual human body and developing new motions. The analysis of the basic motions of the human body is achieved in three steps: constructing a model of the human body applying the actual motions of a human to the model, and analyzing the motions of the segments of the model. The development of new motions is achieved in three steps: application of dynamics, application of constraints, and application of inverse dynamics. In the step of applying dynamics, the human body is divided into a plurality of independent body segments (50, for example) connected by joints, and the motion of each body segment, is calculated independently of the other segments using Newton's equation of motion and Euler's equations. In the step of applying constraints, the articulation of the body and the range of movement of its joints are checked. In the step of applying inverse dynamics, the force modified by the constraints and generating new forces are calculated. Thus, the whole computational complexity becomes O(n).

Accordingly, the method according to the present invention can eliminate the computational complexity of conventional methods, it permits dynamics to be applied to actual animation development, and it permits feedback in real time using dynamics.

Furthermore, in order to calculate the motions of each segment of the human body, since the linear acceleration of the center of gravity is calculated using Newton's equation of motion and the angular acceleration of the center of gravity is calculated using Euler's equations it is possible to determine and display not only the position of and the force exerted on the center of gravity of each segment, but also the position of and the force exerted on the center of gravity of the whole human body.

It is possible according to the present invention to realistically display the motions of a human body using smooth three-dimensional modeling pictures rather than line drawings. In addition, an animator can look at the human body model on the screen from various directions, and can translate or rotate various segments of the human body in an interactive manner. Thus, the animator can ascertain the relationship between the picture and the human body model correctly.

In conventional animation developing methods, basic data on the motions of the human body and the constraints that define the range of movements of individual joints is obtained using the intuition of the animator. In contrast, in the animation developing method according to the present invention, actual dynamic parameters are obtained by analyzing the actual motions of the human body. Accordingly the motions derived from these parameters are reliable and provide realistic motions.

An object-oriented paradigm has recently been used in a number of areas. As a user interface, the object-oriented philosophy leads to a direct manipulation paradigm. In this direct manipulation paradigm, since the images displayed on a screen correspond to objects, by using the animation developing method according to the present invention, the objects can be manipulated directly in the space of the objects.

The above-described processes for analyzing motions and developing new motions according to the present invention can be applied not only to the development of animation but to programming of industrial equipment such as robot control systems, to numerical control systems, to the study of motions in sports or the performing arts, and to the training of animals.

All references cited herein, including journal articles or abstracts, published or corresponding U.S. or foreign patent applications, issued U.S. or foreign patents, or any other references, are entirely incorporated by reference herein, including all data, tables figures, and text presented in the cited references. Additionally, the entire contents of the references cited within the references cited herein are also entirely incorporated by reference.

The foregoing description of the specific embodiments will so fully reveal the general nature of the invention that others can, by applying knowledge within the skill of the art (including the contents of the references cited herein), readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. A method for developing a new computer animation, comprising the steps of:

a) maintaining, in a database, data for modeling a moving body, which body has been divided into a plurality of segments, each of said segments connected by joints and each of said segments acting as a minimal unit of motion, said data relating to an inherent nature of each of said segments and physical constraints including inter-relationship of each segment and range of movements of said joints;

b) observing actual movements of a moving body, including a position of each said segment at predetermined intervals in the course of such actual movement;

c) analyzing the data as to the position of each said segment as observed during actual movements and calculating by inverse dynamics centers of gravity of each said segments and of the whole body, force and torque exerted on each of said centers of gravity and force and torque exerted on each of said joints;

d) inputting the calculated results from said calculating step into said database;

e) determining a new motion to be designed;

f) calculating by dynamics, and neglecting physical constraints, motion of each body segment, independently of the remaining body segments, based on forces corresponding to the new motion selected in said determining step using the data maintained in said database for previously analyzed motions and dynamic equations governing movement of each segment;

g) applying said physical constraints as stored in said database to check that each segment is articulated to the adjacent segment and that the movement of each joint does not exceed the range specified by said physical constraints, and adjusting the position of each segment until each of said physical constraints are met; and h) displaying on a screen the resulting motion of the moving body as designed by said steps of calculating by dynamics and applying physical constraints.

2. A motion analyzing method in accordance with claim 1, further including, after said step g), the steps of:

i) analyzing the data as to the position of each said segment as a result of said applying and adjusting step g) and calculating by inverse dynamics centers of gravity of each of said segments and of the whole body, force and torque exerted on each of said centers of gravity and force and torque exerted on each of said joints, to thereby provide a reasonable and integrated set of forces for dynamics to produce the motions which have been adjusted due to the physical constraints; and j) inputting into said database the calculated results from said analyzing and calculating step (i).

* * * * *